United States Patent
Alexiou et al.

(10) Patent No.: US 10,876,622 B2
(45) Date of Patent: Dec. 29, 2020

(54) DRIVELINE COMPONENT HAVING OIL DISTRIBUTOR SLEEVE

(71) Applicant: BorgWarner Inc., Auburn Hills, MI (US)

(72) Inventors: Arie Alexiou, Pontiac, MI (US); Jason P. Eldred, Swartz Creek, MI (US); Ian D. Worcester, Royal Oak, MI (US); Hongtao Wang, Rochester Hills, MI (US); Gurmeet Singh Bedi, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 85 days.

(21) Appl. No.: 16/035,984

(22) Filed: Jul. 16, 2018

(65) Prior Publication Data

US 2020/0018389 A1  Jan. 16, 2020

(51) Int. Cl.
*F16H 57/04* (2010.01)
*F16D 13/74* (2006.01)

(52) U.S. Cl.
CPC ......... *F16H 57/0473* (2013.01); *F16D 13/74* (2013.01); *F16H 57/045* (2013.01); *F16H 57/0424* (2013.01); *F16H 57/0428* (2013.01); *F16H 57/0483* (2013.01)

(58) Field of Classification Search
CPC ............. F16H 57/0473; F16H 57/0424; F16H 57/0428; F16H 57/045; F16H 57/0483; F16D 13/72; F16D 13/74; F16D 2300/0214; F16D 2300/06
See application file for complete search history.

(56) References Cited

U.S. PATENT DOCUMENTS

| 4,446,953 | A | 5/1984 | Voss et al. |
| 4,629,050 | A | 12/1986 | Valier |
| 4,971,184 | A * | 11/1990 | Lederman ............... F16D 13/74 192/45.006 |
| 5,467,843 | A | 11/1995 | Esch et al. |
| 5,720,372 | A | 2/1998 | Shino et al. |
| 6,189,669 | B1 | 2/2001 | Kremer et al. |
| 6,401,896 | B1 | 6/2002 | Schnepf |
| 6,779,642 | B2 | 8/2004 | Arai et al. |
| 6,976,567 | B2 * | 12/2005 | Kitabayashi ........ F16D 25/0638 192/113.34 |
| 7,753,173 | B2 | 7/2010 | Gratzer et al. |
| 9,423,017 | B1 | 8/2016 | Francis et al. |
| 9,506,504 | B2 | 11/2016 | Francis et al. |
| 9,752,671 | B2 | 9/2017 | Kampe et al. |
| 9,925,868 | B2 | 3/2018 | Palazzolo et al. |

(Continued)

*Primary Examiner* — Mark A Manley
(74) *Attorney, Agent, or Firm* — Burris Law, PLLC (57) ABSTRACT

A driveline component that includes a shaft, a friction clutch, a lubricant passage and an oil distributor sleeve. The friction clutch includes a hub with a hub portion and a plate mount. The oil distributor sleeve is received on the plate mount so that a lubricant chamber is disposed radially between the oil distributor sleeve and the hub portion. The lubricant passage is disposed between the shaft and the lubricant chamber and has a passage outlet that intersects the lubricant chamber. The oil distribution sleeve receives lubrication discharged from the passage outlet and directs the received lubrication to apertures formed through the plate mount.

19 Claims, 5 Drawing Sheets

(56) References Cited

U.S. PATENT DOCUMENTS

| | | | |
|---|---|---|---|
| 2004/0074728 A1* | 4/2004 | Sasse | F16D 13/72 |
| | | | 192/3.21 |
| 2004/0159520 A1 | 8/2004 | Anwar et al. | |
| 2004/0159521 A1* | 8/2004 | Yamamura | F16D 25/123 |
| | | | 192/70.12 |
| 2005/0034927 A1 | 2/2005 | Hong | |
| 2005/0202920 A1 | 9/2005 | Kelley | |
| 2010/0065395 A1* | 3/2010 | Baer | F16D 13/52 |
| | | | 192/70.2 |
| 2010/0122887 A1 | 5/2010 | Pritchard et al. | |
| 2015/0275993 A1 | 10/2015 | Elsesser | |
| 2018/0180113 A1* | 6/2018 | Tokito | F16H 57/0473 |

* cited by examiner

DRIVELINE COMPONENT HAVING OIL DISTRIBUTOR SLEEVE

FIELD

The present disclosure relates to a driveline component having an oil distributor sleeve.

BACKGROUND

This section provides background information related to the present disclosure which is not necessarily prior art.

Passive lubrication techniques are commonly employed to lubricate different components of various driveline components. Passive lubrication techniques can be desirable due to their relatively low cost. In some situations, however, it can be difficult to obtain robust and reliable lubrication of components in a passive manner were the component spins during operation of the driveline component and the lubrication needs to be fed into a radially inner surface of the component. In this regard, surface tension can inhibit migration of the lubrication into a desired area. Moreover, draft (on cast components) and other manufacturing tolerances on the radially inner surface of component may further resist the migration of lubrication into the desired area.

SUMMARY

This section provides a general summary of the disclosure, and is not a comprehensive disclosure of its full scope or all of its features.

In one form, the present disclosure provides a driveline component that includes a shaft, a friction clutch, an oil distributor sleeve, and a lubricant passage. The shaft has an outer circumferential surface. The friction clutch has a clutch hub, a clutch basket, a plurality of first clutch plates, and a plurality of second clutch plates. The clutch hub has a hub portion, which is non-rotatably coupled to the shaft, a first plate mount, and a radial wall that couples the hub portion to the first plate mount such that the first plate mount is spaced radially outward from the hub portion. The first plate mount has a radially inner surface. The clutch basket has a second plate mount that is disposed concentrically about first plate mount. The first clutch plates are axially slidably but non-rotatably coupled to the first plate mount, while the second clutch plates are axially slidably but non-rotatably coupled to the second plate mount. The second clutch plates are interleaved with the first clutch plates. The oil distributor sleeve is mounted to the radially inner surface of the first plate mount and extends along a longitudinal axis of the shaft such that the oil distributor sleeve is disposed about a portion of the hub portion. A lubricant chamber is defined between the hub portion and the oil distributor sleeve. The lubricant passage is disposed between the shaft and the lubricant chamber. The lubricant passage has a passage outlet that intersects the lubricant chamber. The oil distributor sleeve diverges radially outwardly from the hub portion with increasing distance from the passage outlet of the lubricant passage in a direction toward the radial wall.

In another form, the present disclosure provides a driveline component that includes a housing, first and second shafts, a friction clutch, a drive element, a driven element, an endless power transmitting element, an oil distributor sleeve and a lubricant passage. The first shaft is supported in the housing for rotation about a first axis. The second shaft is supported in the housing for rotation about a second axis. The friction clutch has a clutch hub, a clutch basket, a plurality of first clutch plates, and a plurality of second clutch plates. The clutch hub has a hub portion, which is non-rotatably coupled to the first shaft, a first plate mount, and a radial wall that couples the hub portion to the first plate mount such that the first plate mount is spaced radially outward from the hub portion. The first plate mount has a radially inner surface. The clutch basket has a second plate mount that is disposed concentrically about first plate mount. The first clutch plates are axially slidably but non-rotatably coupled to the first plate mount, while the second clutch plates are axially slidably but non-rotatably coupled to the second plate mount. The second clutch plates are interleaved with the first clutch plates. The drive element is coupled to the clutch basket for rotation therewith. The driven element is coupled to the second shaft for common rotation. The endless power transmitting element engages the drive element and the driven element and transmits rotary power there between. The oil distributor sleeve is mounted to the radially inner surface of the first plate mount and extends along a longitudinal axis of the shaft such that the oil spout is disposed about a portion of the hub portion. A lubricant chamber is defined between the hub portion and the oil distributor sleeve. A lubricant passage is disposed between the first shaft and the lubricant chamber. The lubricant passage has a passage outlet that intersects the lubricant chamber. The oil distributor sleeve diverges radially outwardly from the hub portion with increasing distance from the passage outlet of the lubricant passage in a direction toward the radial wall.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
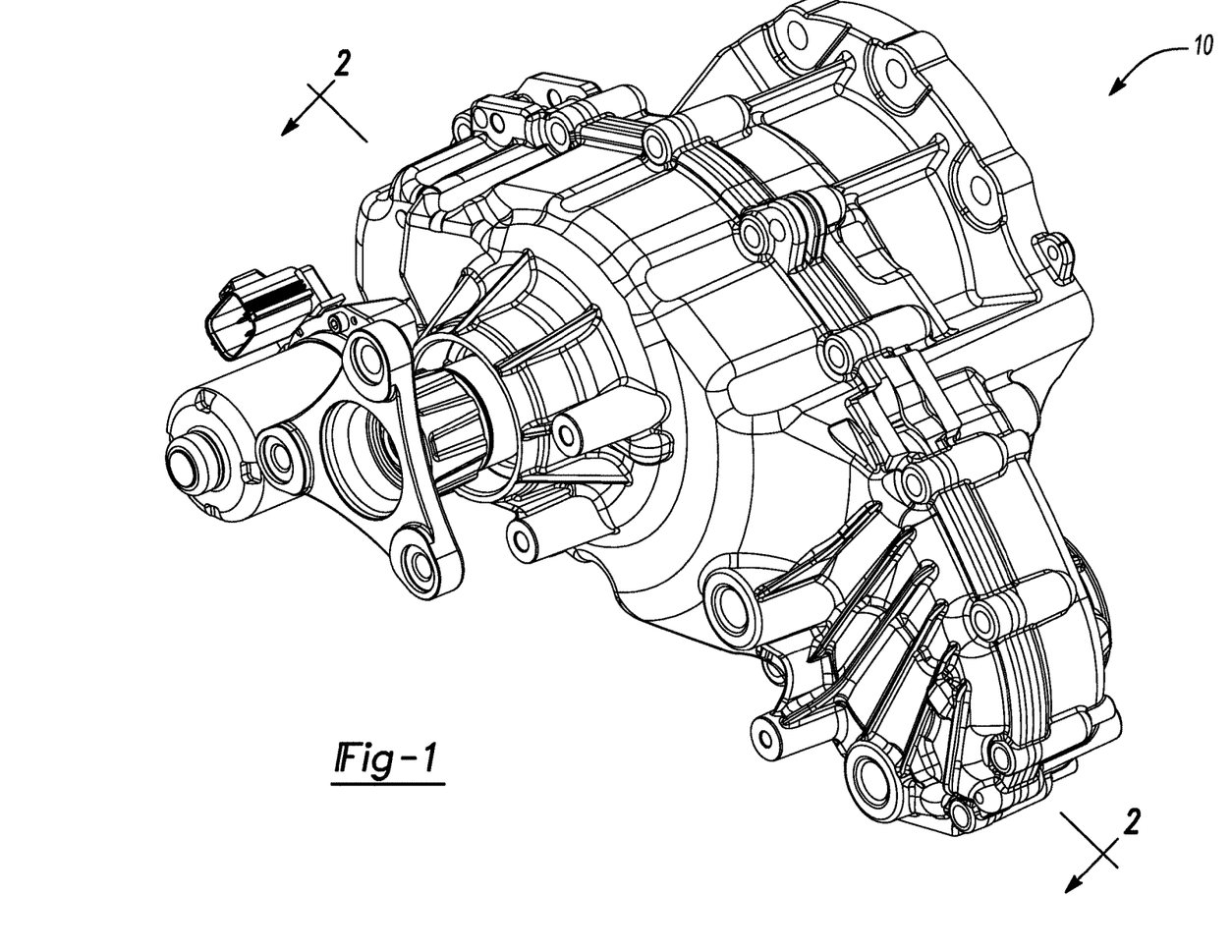
FIG. 1 is a perspective view of an exemplary driveline component constructed in accordance with the teachings of the present disclosure.

With reference to FIG. 1, an exemplary driveline component constructed in accordance with the teachings of the present disclosure is generally indicated by reference numeral 10. The driveline component 10 is illustrated to be a transfer case of the type that is selectively operable in a 2-wheel drive mode and a 4-wheel drive mode. It will be appreciated, however, that the teachings of the present disclosure have application to various other types of driveline components, including power take-off units, axle assemblies and electro-hydraulic clutches (e.g., a Haldex® coupling manufactured by BorgWarner Inc. of Auburn Hills, Mich.).

Figure 2:
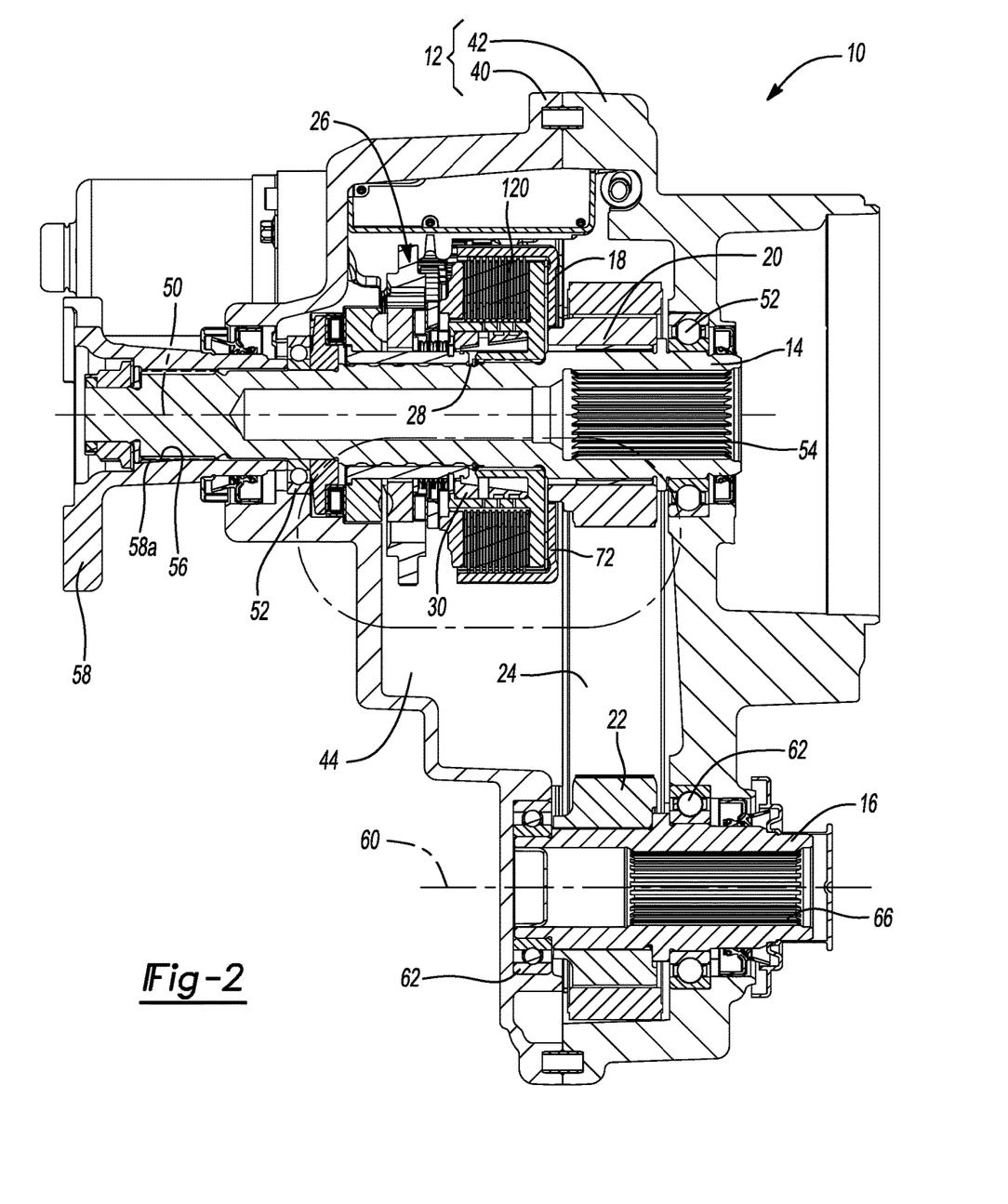
FIG. 2 is a section view taken through the driveline component of FIG. 1.

With reference to FIG. 2, the driveline component 10 can include a housing 12, a first shaft 14, a second shaft 16, a friction clutch 18, a drive element 20, a driven element 22, an endless power transmitting component 24, a clutch actuator 26, a lubricant passage 28 and an oil distributor sleeve 30. The housing 12 can comprises first and second housing halves 40 and 42, respectively, that can be fastened together to define an internal cavity 44 into which the first and second shafts 14 and 16, the friction clutch 18, the drive and driven elements 20 and 22, the endless power transmitting component 24, the clutch actuator 26 and the oil distributor sleeve 30 can be received.

The first shaft 14 can be supported for rotation about a first axis 50 relative to the housing 12 by a pair of first bearings 52. In the example provided, the first shaft 14 has female splined input end 54 and a male splined output end 56. The input end 54 is configured to receive and mating engage a male splined end (not shown) of power and drive train (not shown) that provides a source of rotary power. The output end 56 can be matingly engaged to a female splined aperture 58a in an output flange 58 that can be coupled to a propshaft (not shown) in a conventional manner. The propshaft can conventionally transmit rotary power to a rear axle assembly (not shown).

The second shaft 16 can be supported for rotation about a second axis 60 relative to the housing 12 by a pair of second bearings 62. The second axis 60 can be parallel to the first axis 50. The second shaft 16 can have a female splined output end 66 that can be configured to engage a male splined end (not shown) of a shaft (not shown) that transmits rotary power to a front axle assembly (not shown).

Figure 3:
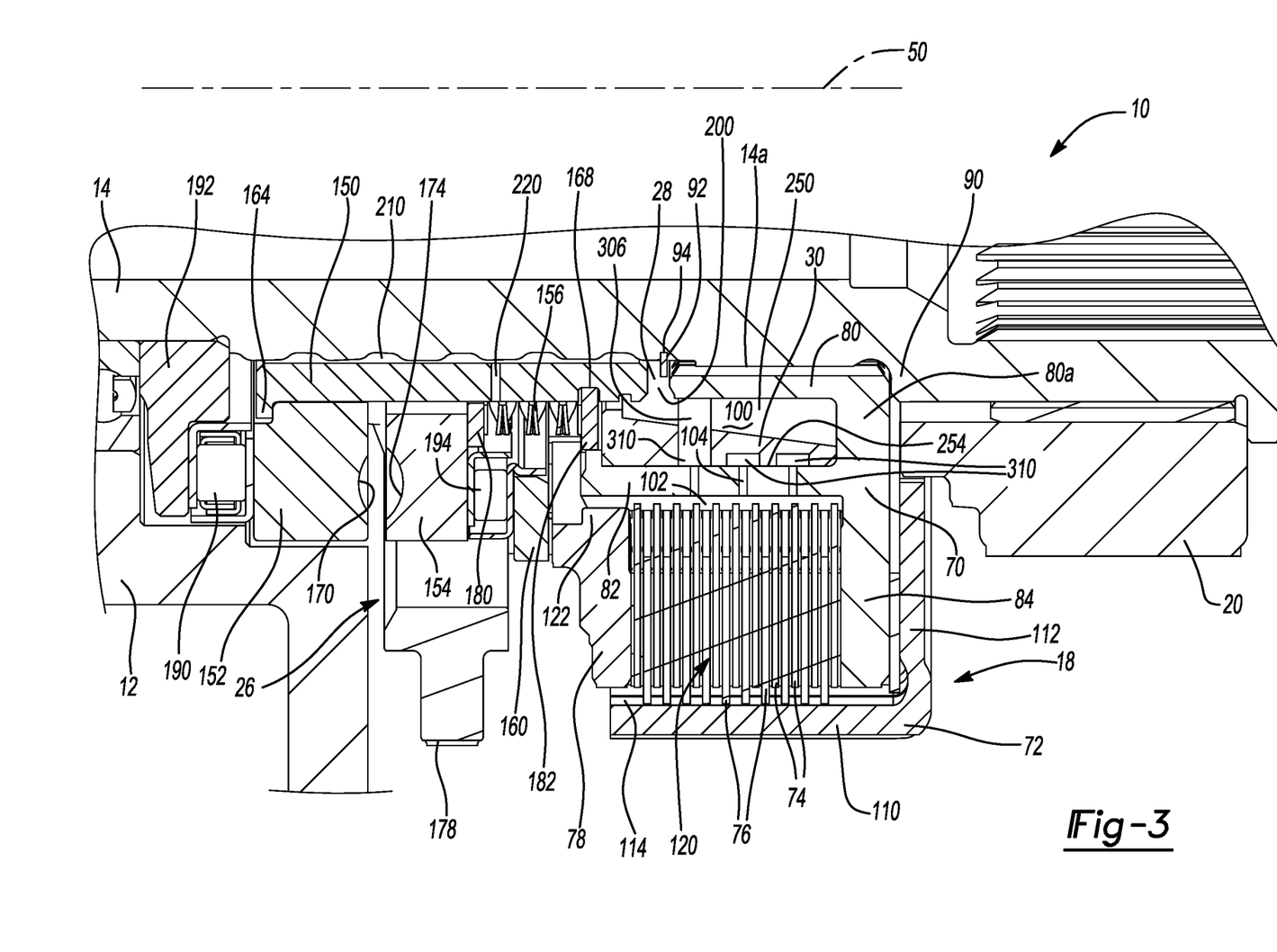
FIG. 3 is an enlarged portion of FIG. 2.

With reference to FIG. 3, the friction clutch 18 can include a clutch hub 70, a clutch basket 72, a plurality of first clutch plates 74, a plurality of second clutch plates 76 and a pressure plate 78. The clutch hub 70 can have a hub portion 80, a first plate mount 82 and a radial wall 84. The hub portion 80 can be non-rotatably coupled to the first shaft 14 in any desired manner. In the example shown, the hub portion 80 defines a female splined aperture that is received on a male splined segment 14a of the first shaft 14. The clutch hub 70 can be abutted against a shoulder 90 on the first shaft 14 and an external snap ring 92, which is received in a ring groove 94 formed in the first shaft 14, can be employed to inhibit or limit movement of the clutch hub 70 along the first axis 50 in a direction away from the shoulder 90. The radial wall 84 can have an annular shape and can be fixedly coupled to and extend radially outwardly from the hub portion 80. The first plate mount 82 can be fixedly coupled to and extend axially from the radial wall 84. The first plate mount 82 can be an annular structure that can be spaced radially outwardly from and concentrically about the clutch hub 70 such that an annular lubricant chamber 100 is disposed radially outwardly of the hub portion 80. The first plate mount 82 can have a radially outer surface with a plurality of spline teeth 102 formed thereon, and a radially inner surface 254. The radially inner surface 254 is machined so as to conform to a right cylinder, but it will be appreciated that the radially inner surface 254 could be formed as with a frusto-conical shape (i.e., with draft) to permit the clutch hub 70 to be formed via casting or in a die (from powdered metal). A plurality of clutch plate lubricant passages 104 are formed radially through the first plate mount 82 so as to intersect the radially outer surface and the radially inner surface 254.

The clutch basket 72 can be a drum-like structure having a second plate mount 110 and an annular wall member 112. The second plate mount 110 can be a circumferentially extending wall that is disposed concentrically about the first plate mount 82. The second plate mount 110 can have an inner circumferential surface, which can have a plurality of spline teeth 114 formed thereon. The annular wall member 112 can extend radially inwardly from the second plate mount 110.

The first clutch plates 74 can be axially slidably but non-rotatably coupled to the first plate mount 82. In the example provided, the first clutch plates 74 conventionally have an aperture that defines a plurality of spline teeth (not specifically shown) and the first plate mount 82 is received into the aperture such that the spline teeth 102 of the first plate mount 82 meshingly engage the spline teeth of the first clutch plates 74.

The second clutch plates 76 can be interleaved with the first clutch plates 74 and can be axially slidably but non-rotatably coupled to the second plate mount 110. In the example provided, the second clutch plates 76 conventionally have an outer diametrical surface that defines a plurality of spline teeth (not specifically shown) and the second clutch plates 76 are received into the second plate mount 110 such that the spline teeth of the second clutch plates 76 meshingly engage the spline teeth 114 of the second plate mount 110.

The first and second clutch plates 74 and 76 can collective form a clutch pack 120 and the pressure plate 78 can be disposed on a side of the clutch pack 120 that is opposite the annular wall member 112 of the clutch basket 72. The pressure plate 78 can be axially slidably but non-rotatably coupled to the first plate mount 82. For example, the pressure plate 78 can have an aperture that defines a plurality of spline teeth 122 and which receives the first plate mount 82 such that the spline teeth 102 of the first plate mount 82 meshingly engage the spline teeth 122 of the pressure plate 78.

Returning to FIG. 2, the drive element 20 can be coupled to the clutch basket 72 for common or joint rotation, the driven element 22 can be coupled to the second shaft 16 for common or joint rotation, and the endless power transmitting component 24 is configured to transmit rotary power between the drive element 20 and the driven element 22. In the example provided, the drive and driven elements 20 and 22 are sprockets and the endless power transmitting component is a loop of chain. It will be appreciated, however, that the drive and driven elements 20 and 22 could be pulleys and the endless power transmitting component 24 could be a belt.

With renewed reference to FIG. 3, the clutch actuator 26 is configured to can be any type of actuator that develop and exert force onto the friction clutch 18 to frictionally engage the first and second clutch plates 74 and 76 to one permit the transmission of rotary power between the clutch hub 70 and the clutch basket 72. In the example provided, the clutch actuator is a ball-ramp actuator and comprises a clutch sleeve 150, a first ball-ramp cam 152, a second ball-ramp cam 154, a biasing spring 156, a plurality of spherical balls (not shown) received between the first and second ball-ramp cams 152 and 154, and an actuator output member 160. The clutch sleeve 150 can be a tubular structure that can be received on the first shaft 14. The clutch sleeve 150 can define a shoulder 164, which can be located proximate a first axial end of the clutch sleeve 150, and a retaining ring groove 168.

The first ball-ramp cam 152 can be fixedly coupled to the housing 12 and can define a plurality of first ball-ramp grooves 170 that are formed into an axial end face of the first ball-ramp cam 152. The first ball-ramp grooves 170 extend in a circumferential direction and the depth of each of the first ball-ramp grooves 170 varies (i.e., tapers) between its opposite ends. The first ball-ramp cam 152 can be fixedly coupled to the clutch sleeve 150 and can be abutted against the shoulder 164. In the example provided, the first ball-ramp cam 152 is press-fit to the clutch sleeve 150, but it will be appreciated that any means, including fasteners and/or splines can be employed to fixedly and/or non-rotatably couple the first ball-ramp cam 152 to the clutch sleeve 150.

The second ball-ramp cam 154 can be received over the clutch sleeve 150 and can define a plurality of second ball-ramp grooves 174 that are formed into an axial end face of the second ball-ramp cam 154. The second ball-ramp grooves 174 extend in a circumferential direction and the depth of each of the second ball-ramp grooves 174 varies (i.e., tapers) between its opposite ends in a manner that is opposite the manner in which each of the first ball-ramp grooves 170 varies (i.e., tapers) between its opposite ends. The second ball-ramp cam 154 is rotatable about the first axis 50 between a first cam position and second cam position. The second ball-ramp cam 154 is also axially movable along the first axis 50 relative to the first ball-ramp cam 152. In the example provided, a gear 178 is employed to rotate the second ball-ramp cam 154 about the first axis 50. The second ball-ramp cam 154 is mounted to the gear 178 concentrically within the gear 178.

The biasing spring 156 can comprise one or more springs that can bias the second ball-ramp cam 154 along the first axis 50 toward the first ball-ramp cam 152. In the example provided, the biasing spring 156 comprises a wave spring that is disposed between a thrust washer 180, which is slidably received on the clutch sleeve 150 and abuts the second ball-ramp cam 154 on a side opposite the first ball-ramp cam 152, and an external snap ring 182 that is received in the retaining ring groove 168 formed in the clutch sleeve 150.

The spherical balls are received between the first and second ball-ramp cams 152 and 154 and each of the spherical balls is received in an associated one of the first ball-ramp grooves 170 and an associated one of the second ball-ramp grooves 174. Rotation of the second ball-ramp cam 154 (via the gear 178) from its first cam position to its second cam positon conventionally causes the spherical balls to roll between the first and second ball-ramp cams 152 and 154 into shallower regions of the first and second ball-ramp grooves 170 and 174, which overcomes the biasing force of the biasing spring 156 and causes the second ball-ramp cam 154 to translate along the first axis 50 in a direction away from the first ball-ramp cam 152. Similarly, rotation of the second ball-ramp cam 154 (via the gear 178) from its second cam position to its first cam position conventionally causes the spherical balls to roll between the first and second ball-ramp cams 152 and 154 into deeper regions of the first and second ball-ramp grooves 170 and 174, which permits the biasing spring 156 to urge the second ball-ramp cam 154 along the first axis 50 in a direction toward the first ball-ramp cam 152.

In the example provided, a first thrust bearing 190 is disposed between the first ball-ramp cam 152 and a flange 192 that is fixedly coupled to the first shaft 14, a second thrust bearing 194 is disposed between the second ball-ramp cam 154 and the actuator output member 160. In this example, the actuator output member 160 is an apply plate that is configured to transmit force between the second ball-ramp cam 154 and the pressure plate 78.

The lubricant passage 28 extends between the first shaft 14 and the lubricant chamber 100 and has a passage outlet 200 that intersects the lubricant chamber 100. The lubricant passage 28 is configured to transmit a lubricant (i.e., oil) into the lubricant chamber 100. In the example provided, the lubricant passage 28 is illustrated as being an axial gap between the clutch sleeve 150 and the hub portion 80 of the clutch hub 70. It will be appreciated, however, that the lubricant passage 28 could comprise one or more holes that are formed through the hub portion 80, the first shaft 14 and/or a structure on the first shaft 14 that is adjacent the hub portion 80 (e.g., the clutch sleeve 150). In the example provided, a spiral groove 210 is employed to urge lubricant between the first shaft 14 and the clutch sleeve 150 toward the lubricant passage 28. The spiral groove 210 is formed on the exterior circumferential surface of the first shaft 14 in the example provided, but it will be appreciated that the spiral groove 210 could be formed into the interior circumferential surface of the clutch sleeve 150 in the alternative. A chamfer formed on the inside diameter of the clutch sleeve 150 on the end of the clutch sleeve 150 that is adjacent to the lubricant passage 28, as well as the external snap ring 92 that retains the clutch hub 70 to the first shaft 14, can help to direct lubricant flowing between the clutch sleeve 150 and the first shaft 14 to enter and travel through the lubricant passage 28.

If desired, one or more auxiliary lubricant passages 220 could be formed in the clutch sleeve 150. In the example shown, one or more auxiliary lubricant passages 220 could be circumferentially spaced apart from one another and can extend through the clutch sleeve 150 at a location radially in-line but radially inward of the second thrust bearing 194. Lubricant passing through the auxiliary lubricant passage(s) 220 can aid in lubricating the second thrust bearing 194, as well as the interfaces between the second thrust bearing 194 and the actuator output member 160.

The oil distributor sleeve 30 is an annular structure that can be received on the first plate mount 82 and is configured to help direct lubricant that has been discharged from the passage outlet 200 into the clutch plate lubricant passages 104 that are formed in the first plate mount 82 so that the lubricant can be distributed in a relatively uniform manner to the clutch pack 120. The oil distributor sleeve 30 can be formed of any desired material, such as plastic, and can be formed in any desired manner, such as injection molding. The oil distributor sleeve 30 can extend along the first axis 50 such that the oil distributor sleeve 30 is disposed radially about a portion of the hub portion 80 and the lubricant passage 28. The oil distributor sleeve 30 can diverge radially outwardly from the hub portion 80 with increasing distance from the passage outlet 200 of the lubricant passage 28 in a direction toward the radial wall 84.

Figure 4:
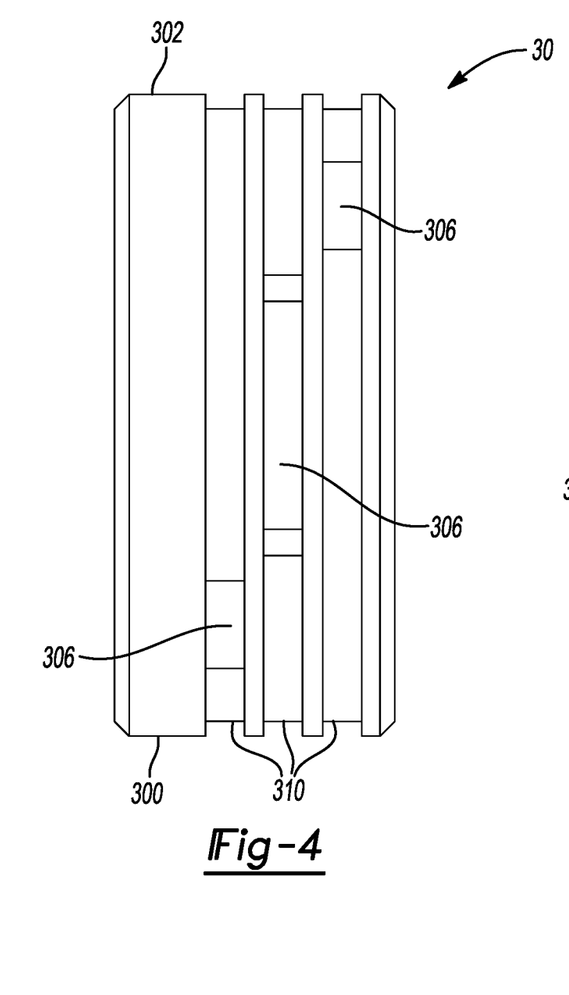
FIG. 4 is a side elevation view of a portion of the driveline component of FIG. 1, illustrating an exemplary oil distributor sleeve in more detail.
Figure 5:
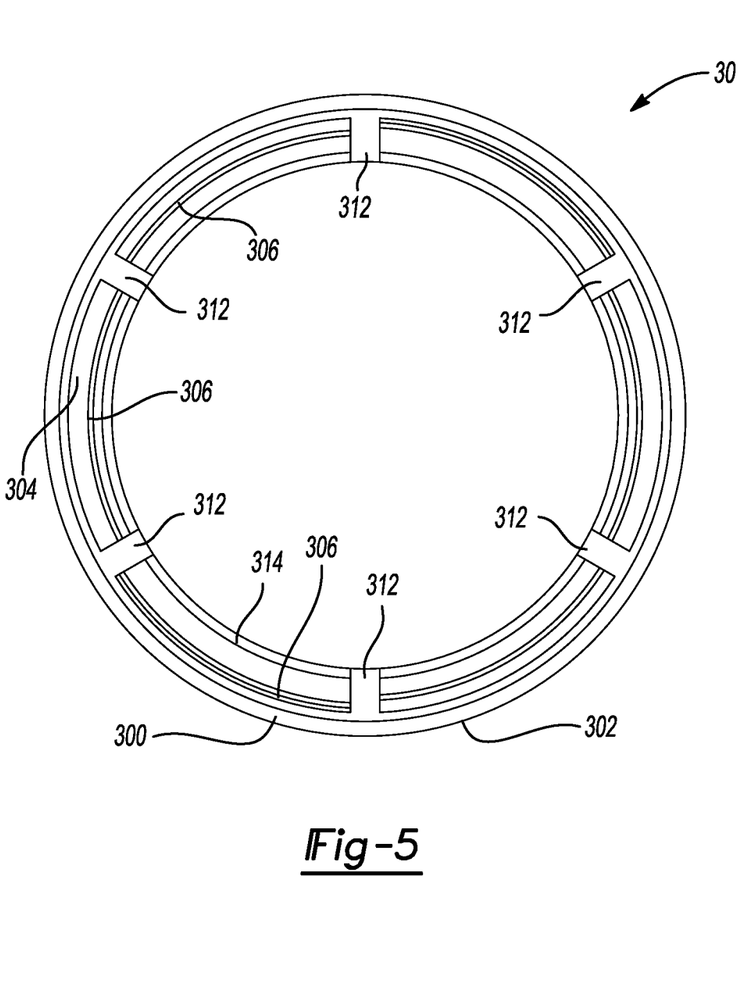
FIG. 5 is a rear elevation view of the oil distributor sleeve.
Figure 6:
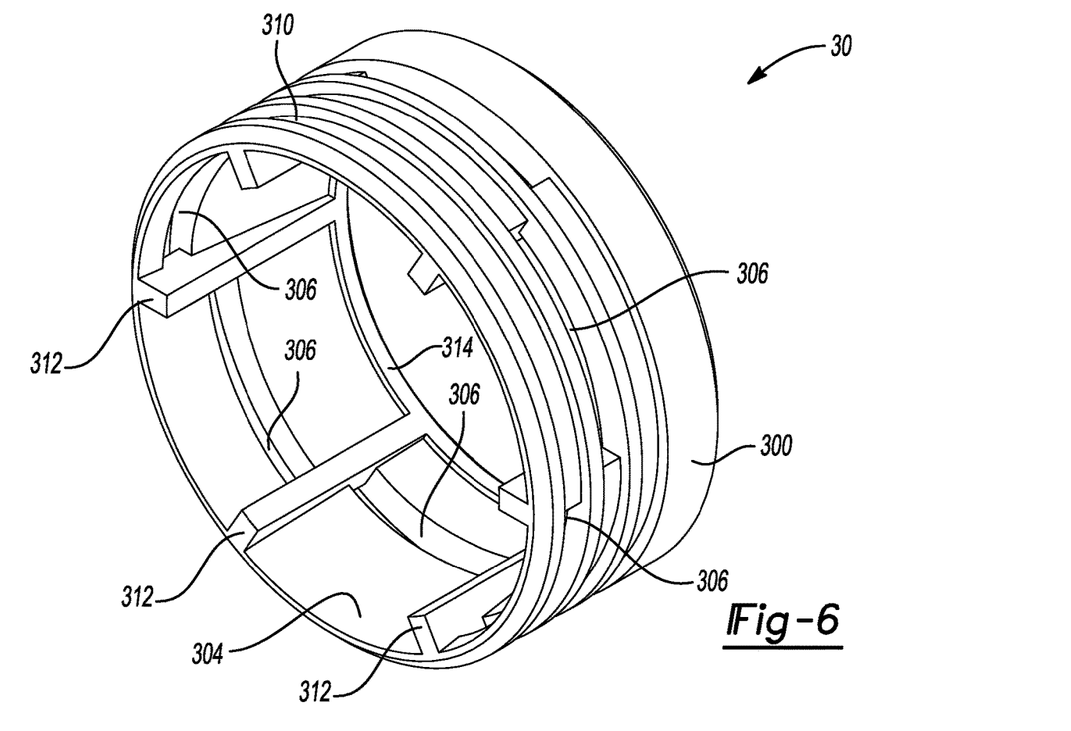
FIG. 6 is a rear perspective view of the oil distributor sleeve.

With reference to FIGS. 4 through 6, the oil distributor sleeve 30 can have a sleeve body 300, which can have an outer sleeve surface 302 and an inner sleeve surface 304, and a plurality of oil distribution apertures 306. Optionally, the oil distributor sleeve 30 can include a plurality of lubricant channels 310, a plurality of longitudinally extending ribs 312 and/or a retention lip 314. The outer sleeve surface 302 is shaped to conform to the radially inner surface 254 (FIG. 3) of the first plate mount 82 (FIG. 3). In the particular example, the outer sleeve surface 302 is cylindrical in shape and is sized to engage the radially inner surface 254 (FIG.

3) of the first plate mount 82 (FIG. 3) in a press-fit manner. It will be appreciated other means can be employed to secure the oil distributor sleeve 30 to the clutch hub 70 (FIG. 3), including threads, fasteners, clips, adhesives, welds, brazing, a retaining ring, snap-lock features, etc. The inner sleeve surface 304 can bound the radially outer side of the lubricant chamber 100 (FIG. 3). The inner sleeve surface 304 can be shaped in any desired manner, but presently it is preferred that the inner sleeve surface 304 diverge radially outwardly from the hub portion 80 (FIG. 3) with increasing distance from the passage outlet 200 (FIG. 3) of the lubricant passage 28 (FIG. 3) in a direction toward the radial wall 84 (FIG. 3). The inner sleeve surface 304 is frusto-conical in the example provided, but other types of diverging surfaces could be employed, such as the surface of a bell-shaped structure. It will be appreciated, however, that the inner sleeve surface 304 could be formed differently, such as in a generally right cylindrical manner. The oil distribution apertures 306 can extend through the sleeve body 300 and can be shaped in any desired manner. In the example provided, the oil distribution apertures 306 are rectangular slots that extend over a portion of the circumference of the sleeve body 300. The oil distribution apertures 306 can be disposed in sets that are spaced apart from one another along the first axis 50 (FIG. 3). The spacing of the sets of the oil distribution apertures 306 along the first axis 50 (FIG. 3) can be equal to a spacing of sets of the clutch plate lubricant passages 104 (FIG. 3) that are formed in the first plate mount 82 (FIG. 3).

The lubricant channels 310 can be formed in the outer sleeve surface 302 and can extend about the circumference of the sleeve body 300. Each of the lubricant channels 310 can intersect a set of the oil distribution apertures 306. When the oil distributor sleeve 30 is assembled to the clutch hub 70 (FIG. 3), the oil distributor sleeve 30 can be pressed onto the first plate mount 82 (FIG. 3) to a predetermined depth to thereby align each of the lubricant channels 310 (and each of the sets of oil distribution apertures 306) to a respective set of the clutch plate lubricant passages 104 (FIG. 3) that are formed in the first plate mount 82 (FIG. 3). It will be appreciated that engagement of the outer sleeve surface 302 to the radially inner surface 254 (FIG. 3) of the first plate mount 82 (FIG. 3) on opposite axial sides of the lubricant channels 310 can help to fluidly decouple or isolate the lubricant channels 310 from one another.

The longitudinally extending ribs 312 can be fixedly coupled to the sleeve body 300 and can extend radially inwardly from the inner sleeve surface 304. Each of the longitudinally extending ribs 312 can abut a circumferential edge of at least one of the oil distribution apertures 306. Accordingly, each of the oil distribution apertures 306 can be bounded on its opposite circumferential sides by a pair of the longitudinally extending ribs 312. Configuration in this manner may help to ensure that relatively equal amounts of lubricant are directed toward each of the oil distribution apertures 306.

Figure 7:
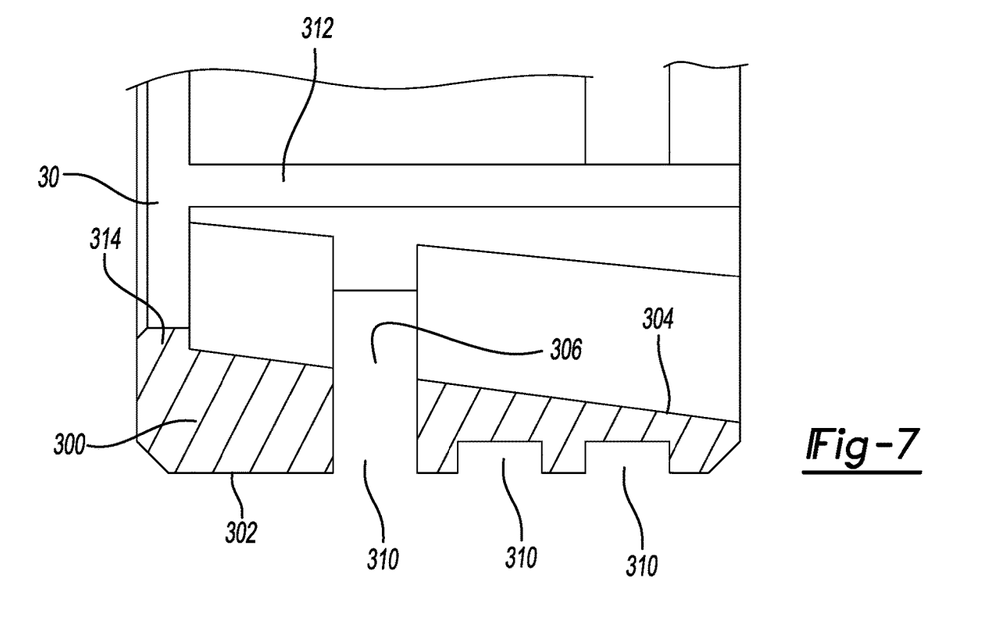
FIG. 7 is a sectional view of a portion of the oil distributor sleeve.

With reference to FIGS. 3, 6 and 7, the retention lip 314 can project radially inwardly from the inner sleeve surface 304. The retention lip 314 can be configured to provide additional structural rigidity to the axial end of the oil distributor sleeve 30 that is disposed opposite the radial wall 84, and can be employed as a verification feature that permits a technician to visually verify that the oil distributor sleeve 30 has been installed to the first plate mount 82 in its proper orientation (i.e., the oil distributor sleeve 30 was not installed backwards with the larger diameter end of the inner sleeve surface 304 facing away from the radial wall 84). Additionally, the retention lip 314 can be sized to ensure that lubricant does not run out of the oil distributor sleeve 30 from the end of the oil distributor sleeve 30 that faces away from the radial wall 84 of the clutch hub 70. In this regard, the retention lip 314 can extend radially inwardly by a desired dimension so that lubricant does not run out of the oil distributor sleeve 30 from the end of the oil distributor sleeve 30 that faces away from the radial wall 84 of the clutch hub 70 when the driveline component 10 is operated on a surface having a maximum desired inclination.

During operation of the driveline component 10, oil transmitted between the first shaft 14 and the clutch sleeve 150 is directed into the lubricant passage 28. Lubricant exits the lubricant passage 28 through the passage outlet 200 and enters the lubricant chamber 100 (i.e., an annular space that is disposed radially between the lubricant passage 28 and the inner sleeve surface 304 of the oil distributor sleeve 30, where it can drain onto the inner sleeve surface of the oil distributor sleeve 30. Oil collected between each adjacent pair of the longitudinally extending ribs 312 can direct the collected oil to a corresponding one of the oil distribution apertures 306, where it can drain through the sleeve body 300 into a corresponding one of the lubricant channels 310. Centrifugal force acting on the lubricant can help force the lubricant through the oil distribution apertures 306, as well as through the clutch plate lubricant passages 104 in the first plate mount 82 to thereby lubricate the first and second clutch plates 74 and 76.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline component comprising:
    a shaft having an outer circumferential surface;
    a friction clutch having a clutch hub, a clutch basket, a plurality of first clutch plates, and a plurality of second clutch plates, the clutch hub having a hub portion, which is non-rotatably coupled to the shaft, a first plate mount, and a radial wall that couples the hub portion to the first plate mount such that the first plate mount is spaced radially outward from the hub portion, the first plate mount having a radially inner surface, the clutch basket having a second plate mount that is disposed concentrically about first plate mount, the first clutch plates being axially slidably but non-rotatably coupled to the first plate mount, the second clutch plates being axially slidably but non-rotatably coupled to the second plate mount, the second clutch plates being interleaved with the first clutch plates;
    an oil distributor sleeve mounted to the radially inner surface of the first plate mount and extending along a longitudinal axis of the shaft such that the oil distributor sleeve is disposed about a portion of the hub portion, wherein a lubricant chamber is defined between the hub portion and the oil distributor sleeve; and
    a lubricant passage disposed between the shaft and the lubricant chamber, the lubricant passage having a passage outlet that intersects the lubricant chamber;

wherein the oil distributor sleeve diverges radially outwardly from the hub portion with increasing distance along the longitudinal axis from the passage outlet of the lubricant passage in a direction toward the radial wall.

2. The driveline component of claim 1, wherein at least a portion of an inside circumferential surface of the oil distributor sleeve is frusto-conically shaped.

3. The driveline component of claim 1, further comprising a clutch sleeve that is received onto the shaft.

4. The driveline component of claim 3, wherein the clutch sleeve is spaced axially apart from the hub portion of the clutch hub to form the lubricant passage.

5. The driveline component of claim 1, wherein the oil distributor sleeve is snap-fit to the radially inner surface of the plate mount.

6. The driveline component of claim 1, wherein the oil distributor sleeve has a sleeve body and a plurality of oil distribution apertures are formed through the sleeve body.

7. The driveline component of claim 6, wherein a plurality of circumferentially extending channels are formed about an exterior surface of the sleeve body, each of the channels being in fluid communication with at least one of the oil distribution apertures.

8. The driveline component of claim 7, wherein the oil distributor sleeve further comprises a plurality of longitudinally extending ribs that are disposed about an interior surface of the sleeve body, each of the longitudinally extending ribs being adjacent a circumferential end of at least one of the oil distribution apertures.

9. The driveline component of claim 8, wherein the oil distribution apertures comprise circumferentially extending slots.

10. A driveline component comprising:
a housing;
a first shaft supported in the housing for rotation about a first axis;
a second shaft supported in the housing for rotation about a second axis;
a friction clutch having a clutch hub, a clutch basket, a plurality of first clutch plates, and a plurality of second clutch plates, the clutch hub having a hub portion, which is non-rotatably coupled to the first shaft, a first plate mount, and a radial wall that couples the hub portion to the first plate mount such that the first plate mount is spaced radially outward from the hub portion, the first plate mount having a radially inner surface, the clutch basket having a second plate mount that is disposed concentrically about first plate mount, the first clutch plates being axially slidably but non-rotatably coupled to the first plate mount, the second clutch plates being axially slidably but non-rotatably coupled to the second plate mount, the second clutch plates being interleaved with the first clutch plates;
a drive element coupled to the clutch basket for rotation therewith;
a driven element coupled to the second shaft for common rotation;
an endless power transmitting element engaging the drive element and the driven element to transmit rotary power there between;
an oil distributor sleeve mounted to the radially inner surface of the first plate mount and extending along the first axis such that the oil distributor sleeve is disposed about a portion of the hub portion, wherein a lubricant chamber is defined between the hub portion and the oil distributor sleeve; and
a lubricant passage disposed between the first shaft and the lubricant chamber, the lubricant passage having a passage outlet that intersects the lubricant chamber;
wherein the oil distributor sleeve diverges radially outwardly from the hub portion with increasing distance along the first axis from the passage outlet of the lubricant passage in a direction toward the radial wall.

11. The driveline component of claim 10, further comprising a clutch actuator having an actuator output member that is configured to translate along the first axis to selectively engage the first and second clutch plates to one another.

12. The driveline component of claim 11, wherein the clutch actuator comprises a clutch sleeve and wherein the lubricant passage is disposed between the first shaft and the clutch sleeve.

13. The driveline component of claim 12, wherein the clutch actuator further comprises a first ball-ramp cam and a second ball-ramp cam, wherein the first ball-ramp cam is non-rotatably coupled to the clutch sleeve.

14. The driveline component of claim 10, wherein the oil distributor sleeve has a sleeve body and a plurality of oil distribution apertures are formed through the sleeve body.

15. The driveline component of claim 14, wherein a plurality of circumferentially extending channels are formed about an exterior surface of the sleeve body, each of the channels being in fluid communication with at least one of the oil distribution apertures.

16. The driveline component of claim 15, wherein the oil distributor sleeve further comprises a plurality of longitudinally extending ribs that are disposed about an interior surface of the sleeve body, each of the longitudinally extending ribs being adjacent a circumferential end of at least one of the oil distribution apertures.

17. The driveline component of claim 16, wherein the oil distribution apertures comprise circumferentially extending slots.

18. The driveline component of claim 10, wherein at least a portion of an inside circumferential surface of the oil distributor sleeve is frusto-conically shaped.

19. The driveline component of claim 12, wherein the clutch sleeve is spaced axially apart from the hub portion of the clutch hub to form the lubricant passage.

* * * * *